United States Patent
Ueda et al.

(10) Patent No.: US 8,115,429 B2
(45) Date of Patent: Feb. 14, 2012

(54) MOTOR CONTROL APPARATUS AND ELECTRIC POWER STEERING SYSTEM

(75) Inventors: Takeshi Ueda, Kashiba (JP); Shigeki Nagase, Nabari (JP); Kouya Yoshida, Kobe (JP)

(73) Assignee: JTEKT Corporation, Osaka-shi (JP)

( * ) Notice: Subject to any disclaimer, the term of this patent is extended or adjusted under 35 U.S.C. 154(b) by 343 days.

(21) Appl. No.: 12/423,393

(22) Filed: Apr. 14, 2009

(65) Prior Publication Data
US 2009/0256503 A1 Oct. 15, 2009

(30) Foreign Application Priority Data
Apr. 14, 2008 (JP) ................... 2008-104688

(51) Int. Cl.
*H02P 21/14* (2006.01)
(52) U.S. Cl. .......... 318/400.02; 318/400.22; 318/400.03
(58) Field of Classification Search ............. 318/400.02, 318/400.03, 400.22
See application file for complete search history.

(56) References Cited

U.S. PATENT DOCUMENTS

| | | | |
|---|---|---|---|
| 2005/0104551 A1* | 5/2005 | Nishimura et al. | 318/719 |
| 2005/0174090 A1* | 8/2005 | Hayashi | 318/807 |
| 2008/0290826 A1* | 11/2008 | Nagase et al. | 318/400.02 |
| 2009/0026988 A1* | 1/2009 | Tomigashi | 318/400.02 |

FOREIGN PATENT DOCUMENTS

| | | | |
|---|---|---|---|
| EP | 1 672 780 A2 | | 6/2006 |
| EP | 1 672 780 A3 | | 6/2006 |
| JP | 10014273 | * | 6/1996 |
| JP | 10-14273 | | 1/1998 |
| JP | 10-257789 | | 9/1998 |
| JP | 2001-268980 | | 9/2001 |
| JP | 2002-234457 | | 8/2002 |
| JP | 2006014431 | * | 6/2004 |
| JP | 2004-208364 | | 7/2004 |
| JP | 2005-229768 | | 8/2005 |
| JP | 2006-14431 | | 1/2006 |
| JP | 2006-14474 | | 1/2006 |

* cited by examiner

*Primary Examiner* — Walter Benson
*Assistant Examiner* — Bryan Gordon
(74) *Attorney, Agent, or Firm* — Oblon, Spivak, McClelland, Maier & Neustadt, L.L.P.

(57) ABSTRACT

If the magnitude of a command voltage vector is greater than a predetermined voltage value indicated by a voltage limit circle, the magnitude of a voltage vector, which corresponds to a q-axis current and which forms the command voltage vector, is adjusted so that the magnitude of the command voltage vector is equal to or less than the predetermined voltage value. Then a q-axis current estimated value is obtained based on i) the ratio of the magnitude of the voltage vector from the q-axis current after adjustment to the magnitude of the voltage vector from the q-axis current before adjustment, and ii) a q-axis current command value.

16 Claims, 9 Drawing Sheets

MOTOR CONTROL APPARATUS AND ELECTRIC POWER STEERING SYSTEM

INCORPORATION BY REFERENCE

The disclosure of Japanese Patent Application No. 2008-104688 filed on Apr. 14, 2008, including the specification, drawings and abstract is incorporated herein by reference in its entirety.

BACKGROUND OF THE INVENTION

1. Field of the Invention

The invention relates to a motor control apparatus for driving a brushless motor, and an electric power steering system provided with that kind of motor control apparatus.

2. Description of the Related Art

Electric power steering systems are known which apply steering assist force to a steering mechanism of a vehicle by driving an electric motor according to steering torque applied by a driver to the steering wheel. Conventional brush motors have come to be widely used for electric motors in electric power steering systems. However, from the viewpoint of improving reliability and durability, as well as reducing inertia and the like, brushless motors have also come to be used in recent years.

In order to control the torque generated by the motor, a motor control apparatus typically detects the current value supplied to the motor and performs PI control (i.e., proportional integral control) based on the difference between a target current value to be supplied to the motor and the detected current value. For example, a motor control apparatus that drives a three-phase brushless motor is provided with two or three current sensors to detect the current values of two or more phases.

However, a motor control apparatus in an electric power steering system requires current sensors that detect a large current of equal to or greater than 100 A. These kinds of current sensors are physically large, which makes it difficult to make the motor control apparatus small. Also, providing the current sensors increases the production cost of the motor control apparatus and also increases power consumption. One possible way to solve these problems is to eliminate the current sensors from the motor control apparatus and control the motor control apparatus by open loop control according to a circuit equation of the motor.

Incidentally, Japanese Patent Application Publication No. 2006-14474 (JP-A-2006-14474) describes an invention that estimates the value of power supply current supplied to a motor drive circuit based on the power supply voltage and the power consumed by a brushless DC motor. Japanese Patent Application Publication No. 2001-268980 (JP-A-2001-268980) describes a motor control apparatus that controls a motor in a feedback manner based on the difference between a current estimated value obtained by calculation from the battery voltage and the rotation speed of the motor and the like, and a set current target value. Japanese Patent Application Publication No. 2002-234457 (JP-A-2002-234457) describes a motor control apparatus that calculates the difference between the design characteristics of a motor and the actual control characteristics of the motor based on a current command value and a motor current value, and then feeds back that difference. Japanese Patent Application Publication No. 2005-229768 (JP-A-2005-229768) describes a brushless motor drive circuit which estimates the current value of current flowing between a power supply and a brushless motor based on the rotation angle of the brushless motor and the wiring resistance value and the like, and determines that there is an abnormality when the estimated current value deviates from a detection current value by a predetermined value or more.

However, in a motor control apparatus having no current sensors, the current value of current that is actually flowing to the brushless motor (hereinafter referred to as the "actual current value") is unable to be detected. As a result, due to a voltage drop resulting from the actual current value deviating from the current command value, the brushless motor is unable to be accurately controlled.

SUMMARY OF THE INVENTION

Therefore, this invention provides a motor control apparatus that accurately controls a brushless motor by obtaining a voltage command value indicative of a voltage to be applied to the brushless motor using a current estimated value, even if no current sensors are provided. This invention also provides an electric power steering system that includes this kind of motor control apparatus.

A first aspect of the invention relates to a motor control apparatus that drives a brushless motor. This motor control apparatus includes a current command value setting portion, a voltage command value calculating portion, a determining portion, a voltage vector adjusting portion and a current estimating portion. The current command value setting portion sets a d-axis current command value and a q-axis current command value which are indicative of currents to be supplied to the brushless motor. The voltage command value calculating portion calculates a d-axis voltage command value and a q-axis voltage command value that are indicative of voltages to be applied to the brushless motor in order to supply the current indicated by the d-axis current command value and the q-axis current command value to the brushless motor. The determining portion determines whether the magnitude of a command voltage vector, in which the d-axis voltage command value is designated as a d-axis voltage component and the q-axis voltage command value is designated as a q-axis voltage component, is greater than a predetermined voltage value. When it is determined by the determining portion that the magnitude of the command voltage vector is greater than the predetermined voltage value, the voltage vector adjusting portion adjusts the magnitude of a voltage vector that corresponds to a q-axis current and that forms the command voltage vector in order to adjust the magnitude of the command voltage vector being equal to or less than the predetermined voltage value. The current estimating portion estimates a q-axis current estimated value based on i) a ratio of the magnitude of the voltage vector after adjustment to the magnitude of the voltage vector before adjustment, and ii) the q-axis current command value.

According to this first aspect, even if no current sensors are provided, the brushless motor can still be accurately controlled because the q-axis current estimated value is obtained based on the q-axis current command value, and a voltage command value indicative of the voltage to be applied to the brushless motor is obtained using the thus obtained q-axis current estimated value. Further, the brushless motor can also be controlled in a failsafe mode using the obtained q-axis current estimated value in order to detect failure of the motor drive circuit or the brushless motor.

A second aspect of the invention relates to a motor control apparatus that drives a brushless motor. This motor control apparatus includes a first current command value setting portion, an angular velocity detecting portion, a second current command value setting portion, a voltage command value calculating portion, a determining portion, a voltage vector adjusting portion and a current estimating portion. The first current command value setting portion sets a q-axis current command value indicative of a current to be supplied to the brushless motor. The angular velocity detecting portion detects the angular velocity of a rotor of the brushless motor. The second current command value setting portion sets a d-axis current command value indicative of a d-axis current to be supplied to the brushless motor based on at least the q-axis current command value and the angular velocity. The voltage command value calculating portion calculates a d-axis voltage command value and a q-axis voltage command value that are indicative of voltages to be applied to the brushless motor in order to supply the current indicated by the d-axis current command value and the q-axis current command value to the brushless motor. The determining portion determines whether the magnitude of a command voltage vector, in which the d-axis voltage command value is designated as a d-axis voltage component and the q-axis voltage command value is designated as a q-axis voltage component, is greater than a predetermined voltage value. When it is determined by the determining portion that the magnitude of the command voltage vector is greater than the predetermined voltage value, the voltage vector adjusting portion adjusts the magnitude of a voltage vector that corresponds to the d-axis current of the vector and that forms the command voltage vector in order to adjust the magnitude of the command voltage vector being equal to or less than the predetermined voltage value. The current estimating portion estimates a d-axis current estimated value based on i) a ratio of the magnitude of the voltage vector after adjustment to the magnitude of the voltage vector before adjustment, and ii) the d-axis current command value.

According to the second aspect, when the brushless motor is operating at a high speed, it can still be accurately controlled because the d-axis current estimated value is obtained based on the d-axis current command value, and the voltage command value of the brushless motor is corrected using the thus obtained d-axis current estimated value. Further, the brushless motor can also be controlled in a failsafe mode using the obtained d-axis current estimated value in order to detect failure of the motor drive circuit or the brushless motor.

The motor control apparatus having the structure described above may also include a first storage portion in which first data indicative of a corresponding relationship between a first parameter value and at least one of a d-axis current value or a q-axis current value is stored, and a parameter value calculating portion that reads the first data corresponding to at least one of the d-axis current estimated value or the q-axis current estimated value from the first storage portion, and calculates a first estimated parameter value based on the read first data and at least one of the d-axis current estimated parameter value or the q-axis current estimated value. The voltage command value calculating portion may obtain the d-axis voltage command value and the q-axis voltage command value using the calculated first estimated parameter value.

With this structure, the first estimated parameter value is obtained using the first data value that corresponds to at least one of the d-axis current estimated value or the q-axis current estimated value, which enables an accurate parameter value to be obtained. Also, the voltage command value calculating portion calculates an accurate d-axis voltage command value and an accurate q-axis voltage command value using the accurate parameter value so the brushless motor can be accurately controlled.

Alternatively, the motor control apparatus having the structure described above may also include a phase current converting portion that converts at least one of the d-axis current estimated value or the q-axis current estimated value to a phase current estimated value.

With this structure, a phase current estimated value to which the d-axis current estimated value or the q-axis current estimated value has been converted is used so the brushless motor can be accurately controlled.

The motor control apparatus having the structure described above may also include a motor driving portion which includes two switching elements connected in series for each phase and drives the brushless motor, a second storage portion in which second data indicative of a corresponding relationship between a second parameter value for each phase and at least one of the d-axis current value or the q-axis current value is stored, and a phase voltage correcting portion that corrects a voltage of a node of the two switching elements. The phase voltage correcting portion may read the second data corresponding to the phase current estimated value from the second storage portion, calculate a second estimated parameter value based on the read second data and the phase current estimated value, and correct the voltage of the node using the calculated second estimated parameter value.

With this structure, the voltage of the node of the two switching elements connected in series in the motor driving portion is controlled based on the phase current estimated value, so fluctuation in the potential of the node during a dead time period can also be controlled.

The motor control apparatus of the first or second aspect described above may also include a command voltage correcting portion which corrects at least one of the d-axis voltage command value or the q-axis voltage command value based on at least one of the d-axis current estimated value or the q-axis current estimated value.

With this structure, the d-axis voltage and the q-axis voltage are corrected without converting the d-axis current estimated value and the q-axis current estimated value into phase currents, thereby enabling the calculation load to be reduced.

A third aspect of the invention relates to an electric power steering system provided with the motor control apparatus according to the first or second aspect.

According to this aspect, a brushless motor can be accurately driven, making smooth steering assist possible, by using the current estimated value in place of the current command value, even if the current command value is very different than the actual current value.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
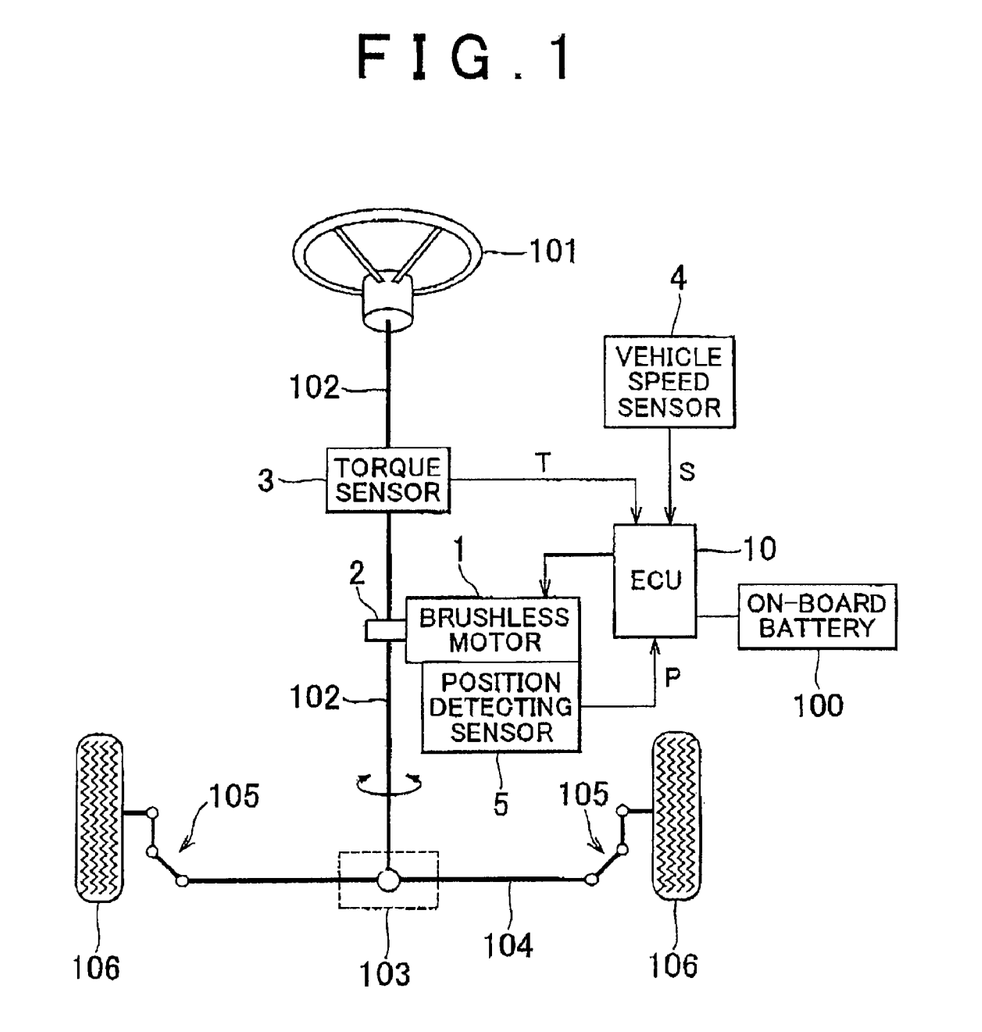
FIG. 1 is a block diagram of the structure of an electric power steering system according to an example embodiment of the invention.

<1. Electric power steering system> FIG. 1 is a block diagram schematically showing the structure of an electric power steering system according to an example embodiment of the invention, together with the structure of a vehicle related to the electric power steering system. The electric power steering system shown in FIG. 1 is a column assist type electric power steering system that includes a brushless motor 1, a reduction gear 2, a torque sensor 3, a vehicle speed sensor 4, a position detecting sensor 5, and an ECU (Electronic Control Unit; hereinafter referred to as "ECU") 10.

As shown in FIG. 1, a steering wheel 101 is fixed to one end of a steeling shaft 102. The other end of the steering shaft 102 is linked to a rack shaft 104 via a rack-and-pinion mechanism 103. Each end of the rack shaft 104 is connected to a wheel 106 via a connecting member 105 consisting of a tie-rod and a knuckle arm. When a driver turns the steering wheel 101, the steering shaft 102 rotates. The rack shaft 104 moves back and forth in response to that rotation, and as it does so, the direction in which the wheels 106 are pointed changes.

The electric power steering system provides steering assist described below to reduce the load on the driver. The torque sensor 3 detects steering torque T applied to the steering shaft 102 by an operation of the steering wheel 101. The vehicle speed sensor 4 detects the vehicle speed S. The position detecting sensor 5 detects the rotational position P of a rotor of the brushless motor 1. The position detecting sensor 5 is formed by a resolver, for example.

The ECU 10 is powered by an on-board battery 100 and drives the brushless motor 1 based on the steering torque T, the vehicle speed S, and the rotational position P. The brushless motor 1 generates steering assist force when driven by the ECU 10. The reduction gear 2 is provided between the brushless motor 1 and the steering shaft 102. The steering assist force generated by the brushless motor 1 is used to rotate the steering shaft 102 via the reduction gear 2.

As a result, the steering shaft 102 rotates by both the steering torque applied to the steering wheel 101 and the steering assist force generated by the brushless motor 1. In this way, the electric power steering system performs steering assist by applying steering assist force generated by the brushless motor 1 to the steering mechanism of the vehicle.

The electric power steering system according to the example embodiment of the invention is characterized by the motor control apparatus that drives the brushless motor 1. Therefore, the motor control apparatus in the electric power steering system will hereinafter be described.

Figure 2:
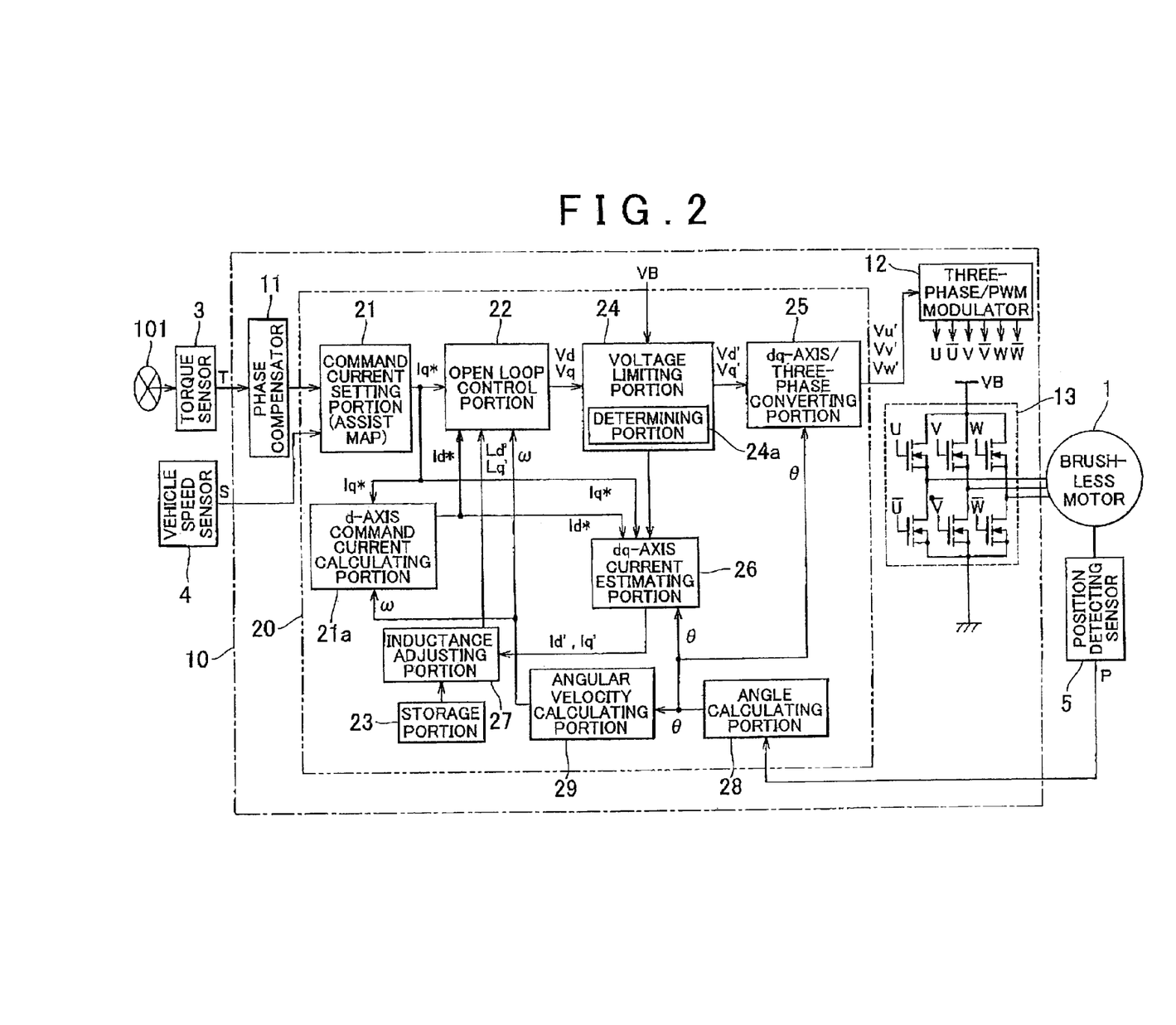
FIG. 2 is a block diagram of the structure of a motor control apparatus according to the example embodiment of the invention.

<2. Motor control apparatus> FIG. 2 is a block diagram of the structure of the motor control apparatus according to the example embodiment of the invention. The motor control apparatus shown in FIG. 2 is formed by the ECU 10 and drives the brushless motor 1 which has three phase windings, i.e., a u-phase winding, a v-phase winding, and a w-phase winding, not shown. The ECU 10 includes a phase compensator 11, a microcomputer 20, a three-phase PWM (Pulse Width Modulation) modulator 12, and a motor drive circuit 13.

The ECU 10 receives a signal indicative of the steering torque T output from the torque sensor 3, a signal indicative of the vehicle speed S output from the vehicle speed sensor 4, and a signal indicative of the rotational position P output from the position detecting sensor 5. The phase compensator 11 performs phase compensation on the steering torque T. The microcomputer 20 obtains a voltage command value used to drive the brushless motor 1. The function of the microcomputer 20 will be described in detail later.

The microcomputer 20 functions as a command current setting portion 21, a d-axis command current calculating portion 21a, an open loop control portion 22, a voltage limiting portion 24, a dq-axis/three-phase converting portion 25, a dq-axis current estimating portion 26, an inductance adjusting portion 27, an angle calculating portion 28, and an angular velocity calculating portion 29, by executing programs stored in memory, not shown, housed in the ECU 10.

The microcomputer 20 obtains the voltage command value indicative of the voltage to be applied to the motor drive circuit 13, according to a circuit equation of the motor, based on a current command value indicative of the current to be supplied to the brushless motor 1 and the angular velocity of the rotor of the brushless motor 1, as described below.

Figure 3:
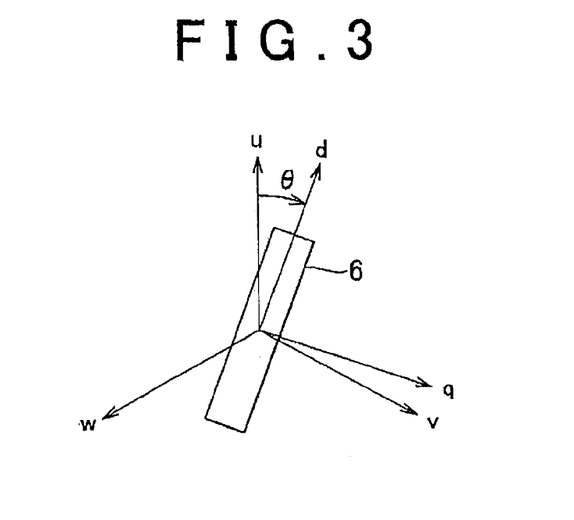
FIG. 3 is a view showing the relationship between a dq-axis coordinate system and a three-phase alternating current coordinate system of a three-phase brushless motor.

The angle calculating portion 28 obtains the rotation angle (i.e., the electrical angle) of the rotor of the brushless motor 1 (hereinafter referred to as "angle θ") based on the rotational position P detected by the position detecting sensor 5. The angular velocity calculating portion 29 obtains the angular velocity (i.e., the rotational velocity of the electrical angle) ω of the rotor of the brushless motor 1 based on the angle θ. Incidentally, the angle θ is the angle created between the u-axis and the d-axis when the u-axis, the v-axis, and the w-axis are set for the brushless motor 1 and the d-axis and the q-axis are set for the rotor 6 of the brushless motor 1, as shown in FIG. 3.

The command current setting portion 21 obtains a q-axis component of the current to be supplied to the brushless motor 1 (hereinafter referred to as "q-axis current command value Iq*") based on the steering torque T after phase compensation (i.e., an output signal from the phase compensator 11) and the vehicle speed S, and outputs the obtained q-axis current command value Iq* to the open loop control portion 22 and the dq-axis current estimating portion 26, which will be described later. More specifically, the command current setting portion 21 houses a table (hereinafter referred to as an "assist map") that stores the corresponding relationship between the steering torque T and the command current, with the vehicle speed S as a parameter, and obtains the q-axis current command value Iq* referencing this assist map. In this way, when a certain amount of steering torque T is applied, the command current setting portion 21 is able to obtain the q-axis current command value Iq* to be supplied to the brushless motor 1 in order to generate an appropriate amount of steering assist force corresponding to that steering torque T, using the assist map.

Also, the d-axis command current calculating portion 21a obtains a d-axis component of the current to be supplied to the brushless motor 1 (hereinafter referred to as "d-axis current command value Id*") based on the q-axis current command value Iq* provided by the command current setting portion 21 and the angular velocity ω provided by the angular velocity calculating portion 29. The d-axis command current calculating portion 21*a* then outputs the obtained d-axis current command value Id* to the open loop control portion 22 and the dq-axis current estimating portion 26 which will be described later. The d-axis current command value Id* does not contribute to the generation of torque so the d-axis command current calculating portion 21*a* can also output a value of zero as the d-axis current command value Id* irrespective of the q-axis current command value Iq* and the angular velocity ω provided by the angular velocity calculating portion 29.

Incidentally, the q-axis current command value Iq* obtained by the command current setting portion 21 is a signed current value. The sign indicates the direction of the steering assist. For example, a plus sign indicates that steering assist is performed for turning to the right, and a minus sign indicates that steering assist is performed for turning to the left.

The open loop control portion 22 obtains the d-axis component and the q-axis component of the voltage to be applied to the brushless motor 1 (hereinafter the value of the d-axis component will be referred to as the "d-axis voltage command value Vd" and the value of the q-axis component will be referred to as the "q-axis voltage command value Vq") based on the q-axis current command value Iq* obtained by the command current setting portion 21, the d-axis current command value Id* obtained by the d-axis command current setting portion 21*a*, and the angular velocity ω obtained by the angular velocity calculating portion 29. The d-axis voltage command value Vd and the q-axis voltage command value Vq are calculated using the circuit equations of the motor shown in Expressions (1) and (2) below.

$$Vd=(R+P\times Ld)\times Id^*-\omega\times Lq\times Iq^* \quad (1)$$

$$Vq=(R+P\times Lq)\times Iq^*+\omega\times Ld\times Id^*+\omega\times\Phi \quad (2)$$

In Expressions (1) and (2), Vd is the d-axis voltage command value, Vq is the q-axis voltage command value, Id* is the d-axis current command value, Iq* is the q-axis current command value, X is the angular velocity of the rotor, R is the circuit resistance including the armature winding resistance, Ld is the self-inductance of the d-axis, Lq is the self-inductance of the q-axis, Φ is $\sqrt{3/2}$ times the maximum value of the number of u-, v-, and w-phase armature winding flux linkages, and P is a differential operator. Of these, R, Ld, and Lq are handled as known parameters and are stored in a storage portion 23. Incidentally, the circuit resistance represented by R includes wiring resistance between the brushless motor 1 and the ECU 10, and the wiring resistance and the resistance of the motor drive circuit 13 within the ECU 10. In this way the open loop control portion 22 functions as a voltage command value calculating portion.

The voltage limiting portion 24 includes a determining portion 24*a*. This determining portion 24*a* compares i) the magnitude $\sqrt{(Vd^2+Vq^2)}$ of a command voltage vector in which the d-axis voltage command value Vd obtained by the open loop control portion 22 is designated as the d-axis voltage component and the q-axis voltage command value Vq obtained by the open loop control portion 22 is designated as the q-axis voltage component, with ii) a power supply voltage value VB provided by the on-board battery 100.

If the determining portion 24*a* determines that the magnitude $\sqrt{(Vd^2+Vq^2)}$ of the command voltage vector is equal to or less than the power supply voltage value VB, the voltage limiting portion 24 outputs the d-axis voltage command value Vd obtained by the open loop control portion 22 to the dq-axis/three-phase converting portion 25 as a d-axis voltage estimated value Vd', and outputs the q-axis voltage command value Vq obtained by the open loop control portion 22 to the dq-axis/three-phase converting portion 25 as a q-axis voltage estimated value Vq'.

If, on the other hand, the determining portion 24*a* determines that the magnitude $\sqrt{(Vd^2+Vq^2)}$ of the command voltage vector is greater than the power supply voltage value VB, the voltage limiting portion 24 calculates the ratio necessary to obtain the d-axis current estimated value Id' and the q-axis current estimated value Iq' according to a method that will be described in detail later, and provides this ratio to the dq-axis current estimating portion 26.

The dq-axis current estimating portion 26 obtains the q-axis current estimated value Iq' by multiplying the ratio provided by the voltage limiting portion 24 by the q-axis current command value Iq* provided by the command current setting portion 21, and obtains the d-axis current estimated value Id' by multiplying the ratio provided by the voltage limiting portion 24 by the d-axis current command value Id* provided by the d-axis command current calculating portion 21*a*. In this way, the voltage limiting portion 24, excluding the determining portion 24*a*, functions as a voltage vector adjusting portion, and the dq-axis current estimating portion 26 functions as a current estimating portion.

The self-inductance Ld of the d-axis changes mainly due to a change in the d-axis current, though it is also affected by a change in the q-axis current. Also, the self-inductance Lq of the q-axis changes mainly due to a change in the q-axis current, through it is also affected by a change in the d-axis current. Therefore, a table that includes data indicative of the corresponding relationship between i) the self-inductance Lq of the q-axis and ii) the q-axis current and the d-axis current, as well as a table that includes data indicative of the corresponding relationship between i) the self-inductance Ld of the d-axis and ii) the d-axis current and the q-axis, are stored in advance in the storage portion 23. Incidentally, the data in the tables is obtained in advance through testing or simulation or the like. Also, the format of the data is not limited to a table. For example, when obtaining the self-inductances Ld and Lq by substituting the d-axis current value and the q-axis current value into an equation, the data may be a coefficient of that equation or in another format.

When the q-axis current estimated value Iq' or the d-axis current estimated value Id' is provided by the dq-axis current estimating portion 26, the inductance adjusting portion 27 reads the self-inductance of the d-axis and the self-inductance of the q-axis that are corresponding to the q-axis current estimated value Iq' and the d-axis current estimated value Id' from the data stored in the storage portion 23. The read self-inductance of the q-axis will be referred to as the "self-inductance Lq' of the q-axis after adjustment" (i.e., an estimated parameter value), and the read self-inductance of the d-axis will be referred to as the "self-inductance Ld' of the d-axis after adjustment" (i.e., an estimated parameter value). The inductance adjusting portion 27 outputs the self-inductance Lq' of the q-axis after adjustment and the self-inductance Ld' of the d-axis after adjustment to the open loop control portion 22. In this way, the inductance adjusting portion 27 functions as a parameter value calculating portion.

The dq-axis/three-phase converting portion 25 converts the d-axis voltage estimated value Vd' and the q-axis voltage estimated value Vq' obtained by the open loop control portion 22 to voltage command values on a three-phase alternating current coordinate axes. More specifically, the dq-axis/three-phase converting portion 25 obtains a u-phase voltage estimated value Vu', a v-phase voltage estimated value Vv', and a w-phase voltage estimated value Vw' using Expressions (3) to (5) below based on the d-axis voltage estimated value Vd' and the q-axis voltage estimated value Vq'.

$$Vu' = \sqrt{2/3} \times \{Vd' \times \cos\theta - Vq' \times \sin\theta\} \quad (3)$$

$$Vv' = \sqrt{2/3} \times \{Vd' \times \cos(\theta - 2\pi/3) - Vq' \times \sin(\theta - 2\pi/3)\} \quad (4)$$

$$Vw' = -Vu' - Vv' \quad (5)$$

The angle θ in Expressions (3) and (4) above is an electrical angle obtained by the angle calculating portion 28. Incidentally, the u-phase voltage estimated value Vu', the v-phase voltage estimated value Vv', and the w-phase voltage estimated value Vw' may also be collectively referred to as "phase voltage estimated values Vu', Vv', and Vw'").

The phase voltage estimated values Vu', Vv', and Vw' obtained by the dq-axis/three-phase converting portion 25 are supplied by the microcomputer 20 to the three-phase PWM modulator 12. The three-phase PWM modulator 12 produces three types of PWM signals (i.e., U, V, and W shown in FIG. 2) having duty ratios corresponding to the levels of the voltages of the three phases obtained by the microcomputer 20. The motor drive circuit 13 is a PWM voltage inverter circuit that includes six MOS-FETs (i.e., Metal Oxide Semiconductor Field Effect Transistors) as switching elements, The six MOS-FETs are controlled by the three types of PWM signals and the negative signals of those PWM signals. Drive currents of the three phases (i.e., a u-phase current, a v-phase current, and a w-phase current) are supplied to the brushless motor 1 by controlling the conduction state of the MOS-FETs using the PWM signals. As a result, sinusoidal currents corresponding to the u-phase voltage estimated value Vu', the v-phase voltage estimated value Vv', and the w-phase voltage estimated value Vw' are supplied to the three-phase windings of the brushless motor 1, causing the rotor of the brushless motor 1 to rotate. As the rotor rotates, torque corresponding to the current flowing through the brushless motor 1 is generated in a rotating shaft of the brushless motor 1. This generated torque is used for auxiliary steering.

<3. Method for Obtaining Current Estimated Value>
<3.1 When Id*=0>

Figure 4:
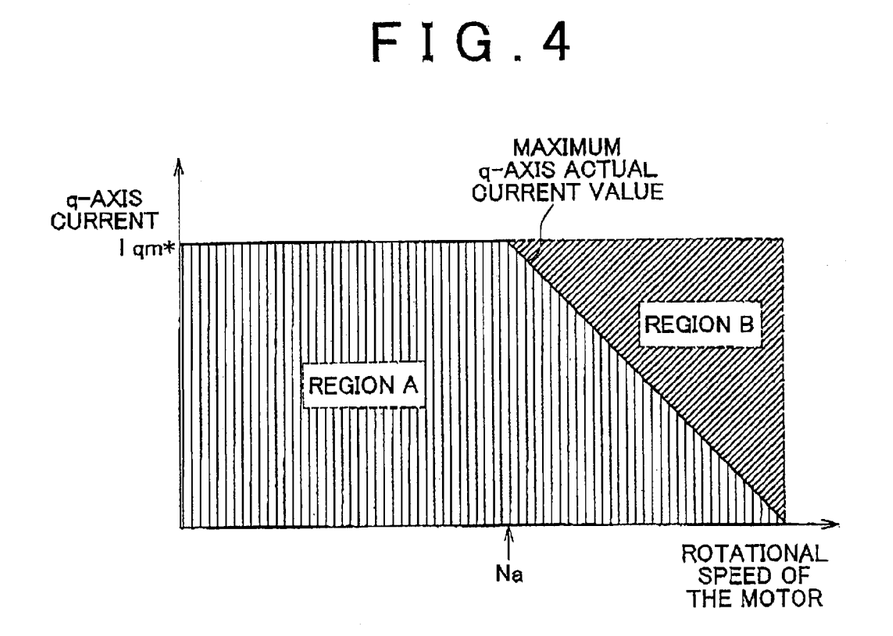
FIG. 4 is a graph showing the relationship between the rotational speed of a brushless motor and the maximum actual current value of current flowing to the brushless motor.

First, a case will be described in which the d-axis current command value Id* that does not contribute to the generation of torque is zero. FIG. 4 is a graph showing the relationship between the rotational speed of the brushless motor 1 and the maximum q-axis actual current value (hereinafter referred to as the "maximum q-axis actual current value Iqm") of the current value of the q-axis current that actually flows through the brushless motor 1 (hereinafter referred to as the "q-axis actual current value Iq"). As shown in FIG. 4, the maximum q-axis actual current command value (hereinafter referred to as the "maximum current command value Iqm*") of the q-axis current command value Iq* is constant regardless of the rotational speed. Also, the maximum q-axis actual current value Iqm is constant when the rotational speed is equal to or less than a predetermined value Na. However, when the rotational speed is greater than the predetermined value Na, the maximum q-axis actual current value Iqm becomes smaller as the rotational speed increases.

The region in FIG. 4 is divided into region A and region B. Region A is a region where the q-axis current command value Iq* is less than the maximum q-axis current command value Iqm* and the maximum q-axis actual current value Iqm. On the other hand, region B is a region where the q-axis current command value Iq* is less than the maximum q-axis current command value Iqm* but greater than the maximum q-axis actual current value Iqm. Because the q-axis actual current value Iq is less than the maximum q-axis actual current value Iqm and the maximum q-axis current command value Iqm* in region A, the q-axis actual current value Iq in that region is estimated to be the same as the q-axis current command value Iq*.

However, in region B, as the rotational speed of the brushless motor 1, i.e., the angular velocity ω, increases, the induced electromotive force (ωΦ) that is proportional to the angular velocity ω in Expression (2) increases and the voltage component (R+P×Lq)×Iq corresponding to the q-axis actual current value Iq decreases. Therefore, if the rotational speed of the brushless motor 1 increases, the maximum q-axis actual current value Iqm decreases in response to that increase. Thus, even if a q-axis current command value Iq* that is larger than the maximum q-axis actual current value Iqm is set, the q-axis actual current value Iq will be unable to be made greater than the maximum q-axis actual current value Iqm determined by the power supply voltage value VB. Therefore, even if a q-axis current command value Iq* that is larger than the maximum q-axis actual current value Iqm but less than the maximum q-axis current command value Iqm* is set, the q-axis actual current value Iq will not be able to reach that q-axis current command value Iq*, and will be estimated to be less than the maximum q-axis actual current value Iqm.

Figure 5:
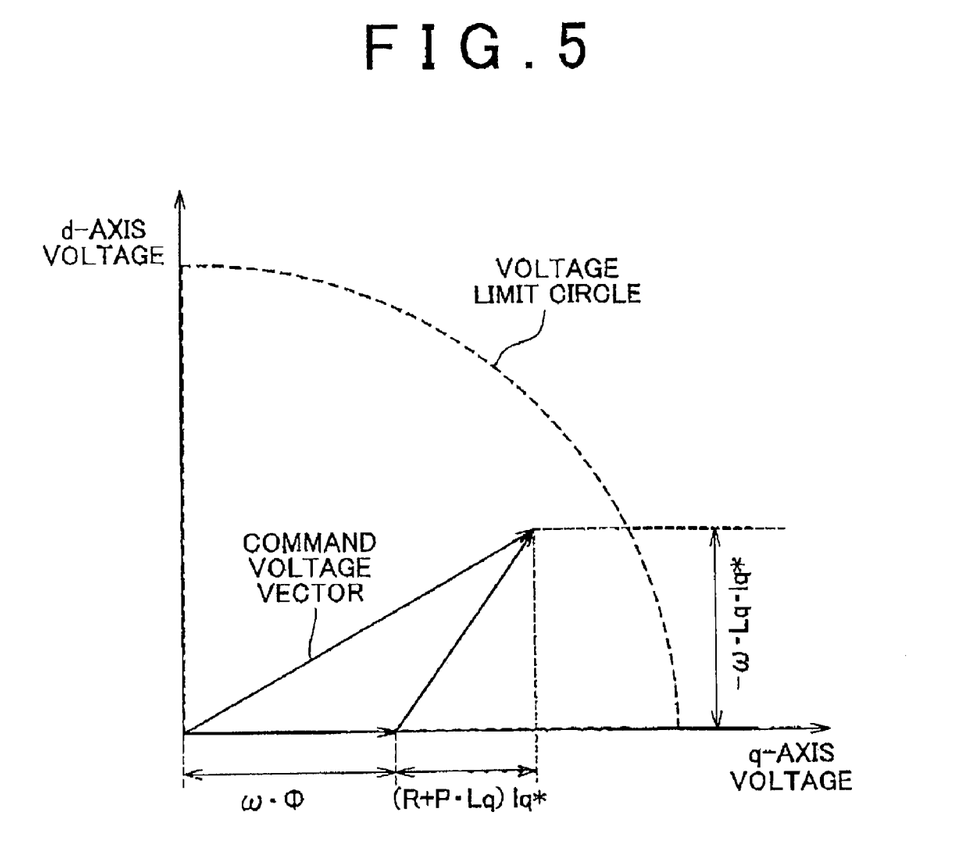
FIG. 5 is a vector graph showing the relationship between d-axis voltage and q-axis voltage in region A shown in FIG. 4.

Therefore, a case in which the q-axis current command value Iq* is a value within region A in FIG. 4 will be described. FIG. 5 is a vector graph showing the relationship between the d-axis voltage and the q-axis voltage in region A in FIG. 4. The d-axis current command value Id* is zero so Expressions (1) and (2) become Expressions (6) and (7), respectively.

$$Vd = -\omega \times Lq \times Iq^* \quad (6)$$

$$Vq = (R + P \times Lq) \times Iq^* + \omega + \Phi \quad (7)$$

As shown in FIG. 5, the magnitude of the command voltage vector in which the d-axis voltage command value Vd is designated as the d-axis voltage component and the q-axis voltage command value Vq is designated as the q-axis voltage component on the dq-axis coordinate system in which the horizontal axis represents the q-axis voltage and the vertical axis represents the d-axis voltage is $\sqrt{(Vd^2+Vq^2)}$. Therefore, the terminus of that command voltage vector is inside of a voltage limit circle indicative of the power supply voltage value VB. Thus, the magnitude $\sqrt{(Vd^2+Vq^2)}$ of the command voltage vector will not become greater than the power supply voltage value VB, and the q-axis current command value Iq* in region A from FIG. 4 will always be equal to or less than the maximum q-axis actual current value Iqm. Therefore, in region A, the q-axis actual current value Iq is estimated to be equal to the q-axis current command value Iq*. Hence, the estimated current value of the q-axis current (hereinafter referred to as the "q-axis current estimated value Iq'") is equal to the q-axis current command value Iq*, as shown in Expression (8) below.

$$Iq' = Iq^* \quad (8)$$

Figure 6:
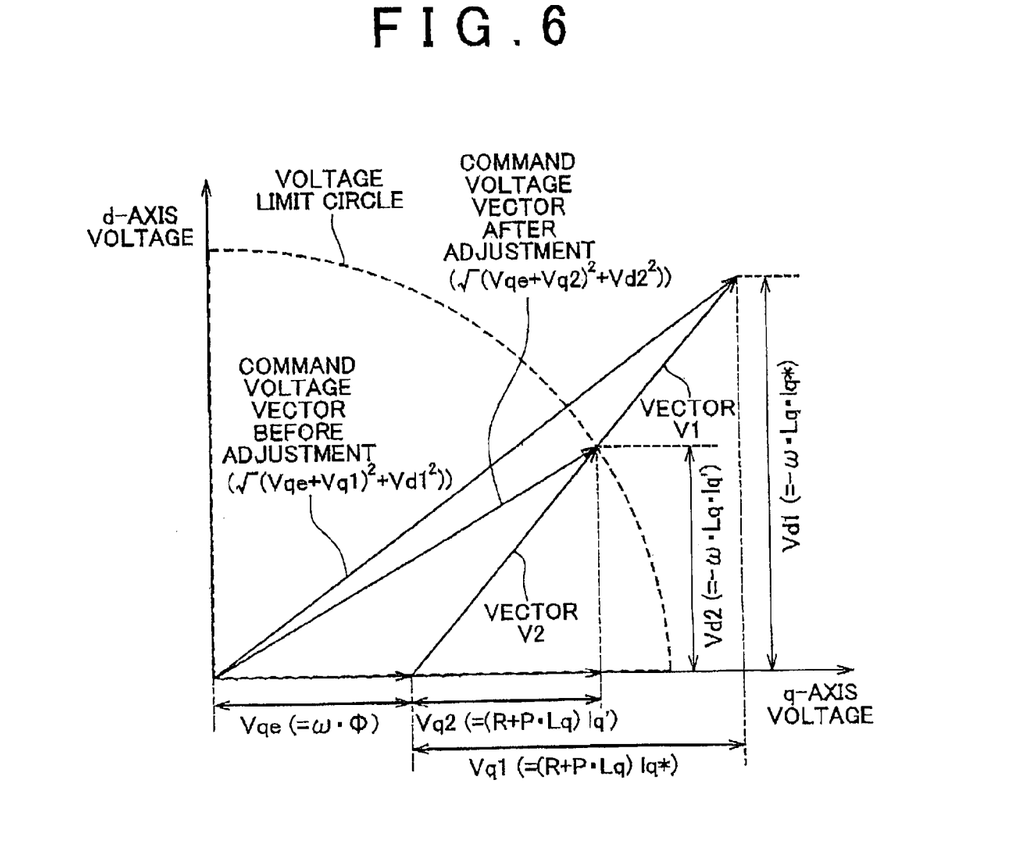
FIG. 6 is a vector graph showing the relationship between d-axis voltage and q-axis voltage in region B shown in FIG. 4.

Next, a case in which the q-axis current command value Iq* is within region B will be described. FIG. 6 is a graph showing the relationship between the d-axis voltage and the q-axis voltage in region B shown in FIG. 4. As shown in FIG. 6, the magnitude $\sqrt{(Vd^2+Vq^2)}$ of the command voltage vector in which the d-axis voltage command value Vd obtained from Expression (6) is designated as the d-axis voltage component and the q-axis voltage command value Vq obtained from Expression (7) is designated as the q-axis voltage component is greater than the power supply voltage VB, so the terminus of the command voltage vector is located outside the voltage limit circle. Therefore, the magnitude of the command voltage vector must be adjusted so that the terminus thereof is either on the circumference of the voltage limit circle or inside the voltage limit circle.

If a vector in which $-\omega \times Lq \times Iq^*$ which is the d-axis voltage command value Vd in Expression (6) is designated as the d-axis voltage component (hereinafter also referred to as "Vd1") and a component $(R+P \times Lq) \times Iq^*$ corresponding to the q-axis current command value Iq* of the q-axis voltage command value Vq in Expression (7) is designated as the q-axis voltage component (hereinafter also referred to as "Vq1"), is designated as vector V1, the inclination k1 thereof can be obtained according to Expression (9) below.

$$k1 = Vd1/Vdq1 \quad (9)$$
$$= -\omega \times Lq \times Iq^* / (R + P \times Lq) \times Iq^*$$
$$= -\omega \times Lq / (R + P + L)$$

In Expression (9), ω, Lq, and R are all regarded as constants, as described above, so the inclination k1 of the vector V1 is considered to be constant irrespective of the amount of q-axis current. Also, the magnitude |V1| of the vector V1 can be expressed by Expression (10) below.

$$|V1| = \sqrt{Vq1^2 + Vd1^2} \quad (10)$$

Therefore, the command voltage vector is adjusted so that the magnitude $\sqrt{(Vd^2+Vq^2)}$ thereof becomes equal to the power supply voltage value VB while the inclination is kept constant. That is, when the terminus of the command voltage vector is adjusted so that it is on the circumference of a current limit circle indicative of a predetermined voltage value Va that is equal to or less than the power supply voltage value VB, the terminus of the vector V1 comes to be located on the circumference of the voltage limit circle while the inclination k1 is kept constant. If the q-axis current at this time is designated as Iq, then a vector V2 in which $-\omega \times Lq \times Iq$ is designated as the d-axis voltage component (hereinafter also referred to as "Vd2") and the component $R+P \times Lq) \times Iq$ corresponding to the q-axis current is designated as the q-axis voltage component (hereinafter also referred to as "Vq2") is obtained. The inclination of the vector V2 obtained in this way is the same as the inclination k1 of the vector V1.

When the d-axis voltage component of the vector V1 is designated as Vd1, the q-axis voltage component of the vector V1 is designated as Vq1, the d-axis voltage component of the vector V2 is designated as Vd2, the q-axis voltage component of the vector V2 is designated as Vq2, and the q-axis induced electromotive force is designated as Vqe (=ωΦ), the method of adjustment described above can be expressed by Expressions (11) to (14) below.

$$Vd = Vd2 \quad (11)$$

$$Vq = Vqe + Vq2 \quad (12)$$

$$\sqrt{(Vqe+Vq2)^2 + Vd2^2} = Va \quad (13)$$

$$k1 = Vd1/Vq1 = Vd2/Vq2 \quad (14)$$

In Expressions (11) to (14) above, Vqe, Vd1, and Vq1 are known so Vd2 and Vq2 are obtained from Expressions (11) to (14). Furthermore, when the ratio of the q-axis voltage component Vq1 of the vector V1 to the q-axis voltage component Vq2 of the vector V2, or the ratio of the d-axis voltage component Vd1 of the vector V1 to the d-axis voltage component Vd2 of the vector V2 is obtained, those relationships are as shown in Expression (15) below.

$$Vq2/Vq1 = Vd2/Vd1 = |V2|/|V1| \quad (15)$$

where |V2| is the magnitude $\sqrt{Vd2^2+Vq2^2}$ of the vector V2.

Accordingly, the q-axis estimated value Iq' can be obtained according to Expression (16) below using the ratio Vq2/Vq1 obtained in this way and the q-axis current command value Iq*.

$$Iq' = (Vq2/Vq1) \times Iq^* \quad (16)$$

In this way, when the magnitude $\sqrt{(Vd^2+Vq^2)}$ of the command voltage vector is greater than the power supply voltage value VB, the q-axis current estimated value Iq' can be obtained by multiplying the ratio Vq2/Vq1 of the q-axis voltage component Vq1 of the vector V1 to the q-axis voltage component Vq2 of the vector V2 by the q-axis current command value Iq*.

Incidentally, when the ratio Vd2/Vd1 is used, the q-axis current estimated value Iq' can also be obtained according to Expression (17) below.

$$Iq' = (Vd2/Vd1) \times Iq^* \quad (17)$$

In this case, according to the motor control apparatus of this example embodiment, a q-axis current estimated value Iq' that is close to the q-axis actual current value can easily be obtained based on the q-axis current command value Iq* even if no current sensors are provided. Also, an accurate q-axis inductance Lq' and an accurate d-axis inductance Ld' can be obtained using the q-axis current estimated value Iq', so the open loop control portion 22 is able to calculate an accurate d-axis voltage estimated value Vd' and an accurate q-axis voltage estimated value Vq'. Therefore, the brushless motor 1 can be accurately controlled by using the d-axis voltage estimated value Vd' and the q-axis voltage estimated value Vq' obtained in this way as the voltage command values. Also, the brushless motor 1 can also be controlled in a failsafe mode using the obtained q-axis current estimated value Iq' in order to detect failure of the motor drive circuit 13 or the brushless motor 1.

<3.2 When Id*≠0>

The foregoing example embodiment describes a case in which the d-axis current command value Id* is zero because the d-axis current does not contribute to the generation of torque. However, when flux weakening control is performed on the brushless motor 1 or when the brushless motor 1 is operated at a high speed, the d-axis current is used. Accordingly, a case in which the d-axis current command value Id* is not zero will be described next.

The d-axis current command value Id* can be obtained by the d-axis command current calculating portion 21a based on i) the q-axis current command value Iq* provided by the command current setting portion 21, and ii) the rotation angular velocity ω of the rotor calculated by the angular velocity calculating portion 29 based on the position information P provided by the position detecting sensor 5. Then when the q-axis current command value Iq* determined by the command current setting portion 21 and the d-axis current command value Id* obtained by the d-axis command current calculating portion 21a are provided to the open loop control portion 22, the open loop control portion 22 obtains the d-axis voltage command value Vd and the q-axis voltage command value Vq.

Figure 7A:
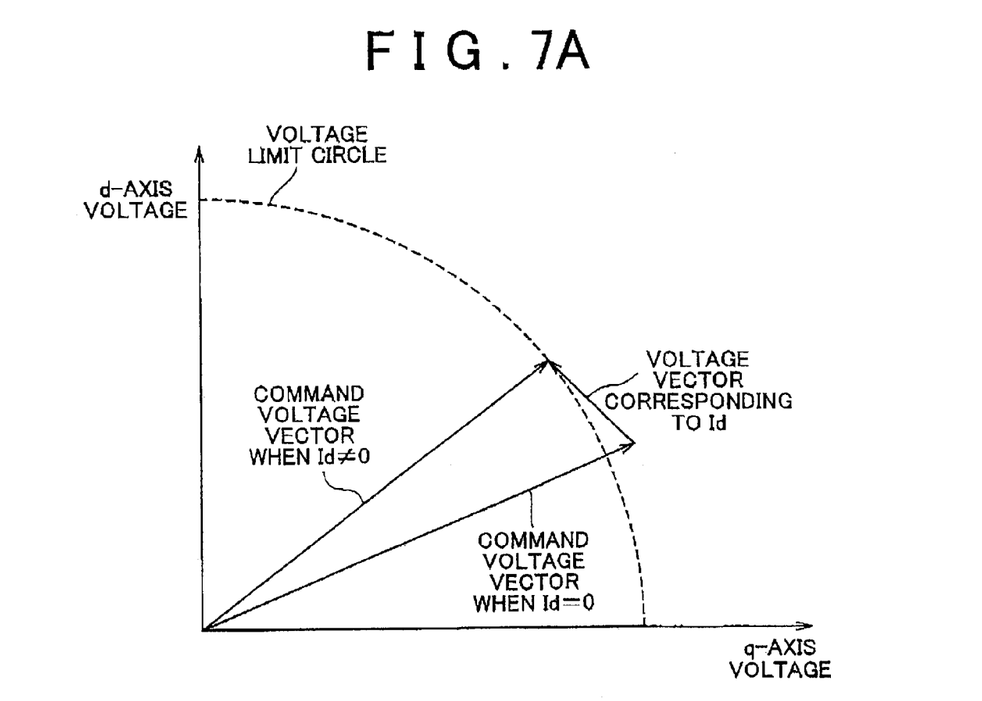
FIG. 7A is a vector graph showing a command voltage vector when a d-axis current command value is not zero.
Figure 7B:
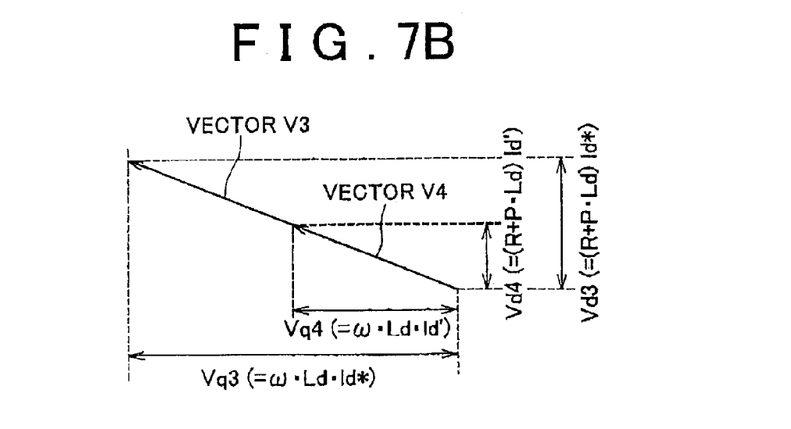
FIG. 7B is a vector graph showing a method for limiting the d-axis voltage command value and a q-axis voltage command value from the d-axis current command value so that they are equal to or less than a predetermined voltage value.

FIG. 7A is a vector graph showing the command voltage vector when the d-axis current command value Id* is not zero, and FIG. 7B is a vector graph showing a method for limiting the d-axis voltage command value Vd and the q-axis voltage command value Vq from the d-axis current command value Id* so that they are equal to or less than a predetermined voltage value Vb. As shown in FIG. 7A, the magnitude of the voltage vector from the d-axis current is adjusted so that it is equal to or less than the predetermined voltage value Vb in order to position the terminus of a command voltage vector which is a combination of the command voltage vector when Id=0 and a voltage vector from the d-axis current either on the circumference of a voltage limit circle indicative of the power supply voltage value VB or inside that voltage limit circle.

This method of adjustment is the same as when Id=0 described above, so only a simple description will be given with reference to FIG. 7B. In order to limit the magnitude of the voltage vector from the d-axis current so that it is equal to or less than the predetermined voltage value Vb, a vector in which the component (R+P×Ld)×Id* (hereinafter also referred to as "Vd3") from the d-axis current command value Id* of the d-axis voltage command value Vd when the d-axis current command value Id* is used is designated as the d-axis voltage component, and the component ω×Ld×Id* (hereinafter also referred to as "Vq3") from the d-axis current command voltage Id* of the q-axis voltage command value Vq is designated as the q-axis voltage component, is designated as vector V3. The inclination k2 of the vector V3 is (R+P×Ld)/ω×Ld and is thus considered to be constant regardless of the amount of d-axis current.

Therefore, to adjust the magnitude |V3| of the vector V3 so that it is equal to or less than the predetermined voltage value Vb, only the magnitude |V3| of the vector V3 need be adjusted by changing the amount of d-axis current while the inclination is kept at k2. When the d-axis current after the adjustment is designated as Id, a vector V4 in which the component (R+P×Ld)×Id (hereinafter also referred to as "Vd4") corresponding to the d-axis current Id is designated as the d-axis voltage component, and ω×Ld×Id (hereinafter also referred to as "Vq4") corresponding to the d-axis current Id is designated as the q-axis voltage component is obtained. Accordingly, just as when the d-axis current command value Id* is zero, when the relationship between i) the d-axis voltage components Vd3 and Vd4 of the vectors V3 and V4 and ii) the q-axis voltage components Vq3 and Vq4 of the vectors V3 and V4 are obtained, that relationship is as shown in Expression (18) below.

$$Vd4/Vd3 = Vq4/Vq3 = |V4|/|V3| \quad (18)$$

where |V3| is the magnitude of the vector V3 and |V4| is the magnitude of the vector V4.

Accordingly, the d-axis current estimated value Id' can be obtained according to Expression (19) below using the ratio obtained in this way and the d-axis current command value Id*.

$$Id' = (Vd4/Vd3) \times Id^* \quad (19)$$

In this way, when the magnitude of the voltage vector corresponding to the d-axis current is greater than the predetermined voltage value Vb, the d-axis current estimated value Id' can be obtained by multiplying the ratio of the d-axis voltage component Vd3 of the vector V3 to the d-axis voltage component Vd4 of the vector V4 by the d-axis current command value Id*.

Incidentally, when the ratio Vq4/Vq3 is used, the d-axis current estimated value Id' can also be obtained according to Expression (20) below.

$$Id' = (Vq4/Vq3) \times Iq^* \quad (20)$$

In this case, even if the d-axis current command value Id* is not zero, a d-axis current estimated value Id' that is close to the d-axis actual current value can easily be obtained based on the d-axis current command value Id*. Also, the d-axis voltage estimated value Vd' and the q-axis voltage estimated value Vq' can be calculated by using the obtained d-axis current estimated value Id', and the brushless motor 1 can be accurately controlled by using those calculated values as the voltage command values Vd and Vq, respectively. Also, the brushless motor 1 can also be controlled in a failsafe mode using the obtained d-axis current estimated value Id' in order to detect failure of the motor drive circuit 13 or the brushless motor 1.

<4. Modified example> The foregoing example embodiment describes a case in which open loop control is performed on the motor control apparatus. However, just as with the feedback control, the d-axis current estimated value and the q-axis current estimated value may also be obtained and the voltage command value applied to the motor drive circuit may be corrected using the obtained d-axis current estimated value and the d-axis current estimated value.

<5. Practical application> A case in which the brushless motor 1 is controlled using the current estimated values Id' and Iq' obtained when open loop control is performed on the motor control apparatus will now be described.

Figure 8:
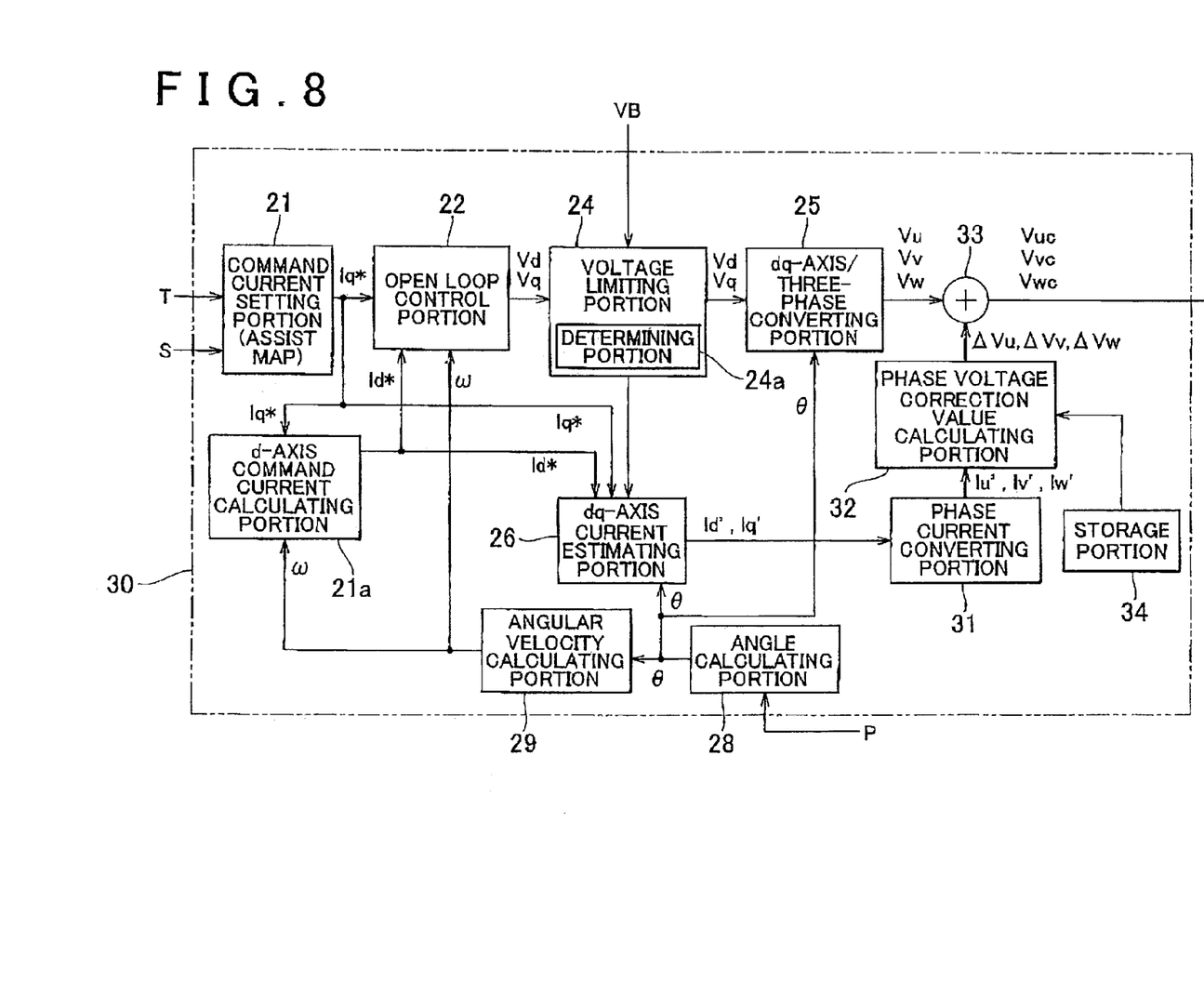
FIG. 8 is a block diagram showing the functional structure realized by a microcomputer used in a first practical application.

<5.1 First practical application> FIG. 8 is a block diagram showing the functional structure realized by a microcomputer 30 used in a first practical application. The microcomputer 30 is used in place of the microcomputer 20 that is used in the motor control apparatus shown in FIG. 2. Some the functional constituent elements of the microcomputer 30 have been changed. Accordingly, the functional constituent elements of the microcomputer 30 that are the same as those of the microcomputer 20 will be denoted by the same reference characters and descriptions of those elements will be omitted. Only the functional constituent elements that are different will be described here. As shown in FIG. 8, the microcomputer 30 does not have the storage portion 23 or the inductance adjusting portion 27 that are in the microcomputer 20. Instead, the microcomputer 30 has a phase current converting portion 31, a phase voltage correction value calculating portion 32, an adder 33, and a storage portion 34. Also, the phase voltage correction value calculating portion 32 performs the calculation after reading the necessary data from the storage portion 34.

The phase current converting portion 31 converts the d-axis current estimated value Id' and the q-axis current estimated value Iq' obtained by the dq-axis current estimated portion 26 to phase current estimated values Iu', Iv', and Iw' of the three phases using a circuit equation of the motor. The phase voltage correction value calculating portion 32 obtains the phase voltage correction values ΔVu, ΔVv, and ΔVw for correcting the phase voltage command values Vu, Vv, and Vw of the three phases converted by the dq-axis/three-phase converting portion 25, based on i) the phase current estimated values Iu', Iv', and Iw' obtained by the phase current converting portion 31 and ii) the data read from the storage portion 34, and then outputs the obtained phase voltage correction values ΔVu, ΔVv, and ΔVw to the adder 33. The adder 33 then obtains corrected phase voltage command values Vuc, Vvc, and Vwc by adding the phase voltage correction values ΔVu, ΔVv, and ΔVw to the phase voltage command values Vu, Vv, and Vw of the three phases, respectively, and outputs those corrected phase voltage command values Vuc, Vvc, and Vwc to the three-phase PWM modulator 12 provided outside of the microcomputer 30. In this case, the phase voltage correction values ΔVu, ΔVv, and ΔVw are obtained after converting the d-axis current estimated value Id' and the q-axis current estimated value Iq' to the phase current estimated values Iu', Iv', and Iw' of the three phases. As a result, the calculation load of the microcomputer 30 does increase, but the brushless motor 1 can be accurately controlled.

A method for suppressing a voltage drop from the power supply terminal to the node N in the motor drive circuit 13 will now be described as an example of when this kind of microcomputer 30 is used. In the motor drive circuit 13, two MOS-FETs are connected in series for each phase and the node is connected to the input terminal of the brushless motor 1. Therefore, when current flows from the power supply terminal to the input terminal of the brushless motor 1, a voltage drop that is determined by the wiring resistance between the power supply terminal and the input terminal of the brushless motor 1, the resistance value from the ON resistance of the MOS-FETs, and the current that flows between the power supply terminal and the brushless motor 1 occurs.

When the motor control apparatus having no current sensors is controlled by open loop control according to a circuit equation of the motor, the current flowing between the power supply terminal and the input terminal of the brushless motor 1 is unable to be detected so a voltage drop resulting from the current value changing from the command value is unable to be corrected. Therefore, the corresponding relationship between the current and the resistance value between the power supply terminal and the brushless motor 1 is obtained in advance and stored in the storage portion 34 in the format of a table for example. The phase current converting portion 31 converts the d-axis current estimated value Id' and the q-axis current estimated value Iq' provided by the dq-axis current estimating portion 26 to the phase current estimated values Iu', Iv', and Iw'. In this case, the converted phase current estimated values Iu', Iv', and Iw' are considered to correspond to the phase currents flowing between the power supply terminal and the input terminal of the brushless motor 1.

The phase voltage correction value calculating portion 32 reads the resistance values corresponding to the phase current estimated values Iu', Iv', and Iw' from the storage portion 34, and obtains the voltage drops ΔVu, ΔVv, and ΔVw (i.e., second estimation parameter values) of the phases based on the read resistance values and the phase current estimated values Iu', Iv', and Iw'. Next, the adder 33 obtains phase voltage command values Vuc, Vvc, and Vwc that have been corrected for the voltage drop by adding the voltage drops ΔVu, ΔVv, and ΔVw to the phase voltage command values Vu, Vv, and Vw of the three phases, respectively. The motor drive circuit 13 is controlled based on the phase voltage command values Vuc, Vvc, and Vwc after the correction, so fluctuation in the current supplied to the brushless motor 1 due to a voltage drop can be suppressed.

Incidentally, in this practical application, a method for suppressing a voltage drop from the power supply terminal to the node N is described, but the invention may also be applied in the same way when suppressing a voltage drop from the node N to a ground terminal.

Also, in this practical application, the phase voltage correction values ΔVu, ΔVv, and ΔVw are obtained using the phase current estimated values Iu', Iv', and Iw' to which the d-axis current estimated value Id' and the q-axis current estimated value Iq' have been converted. Alternatively, however, another circuit may be directly controlled using the phase current estimated values Iu', Iv', and Iw'. In this case, the storage portion 34 is not needed.

Figure 9:
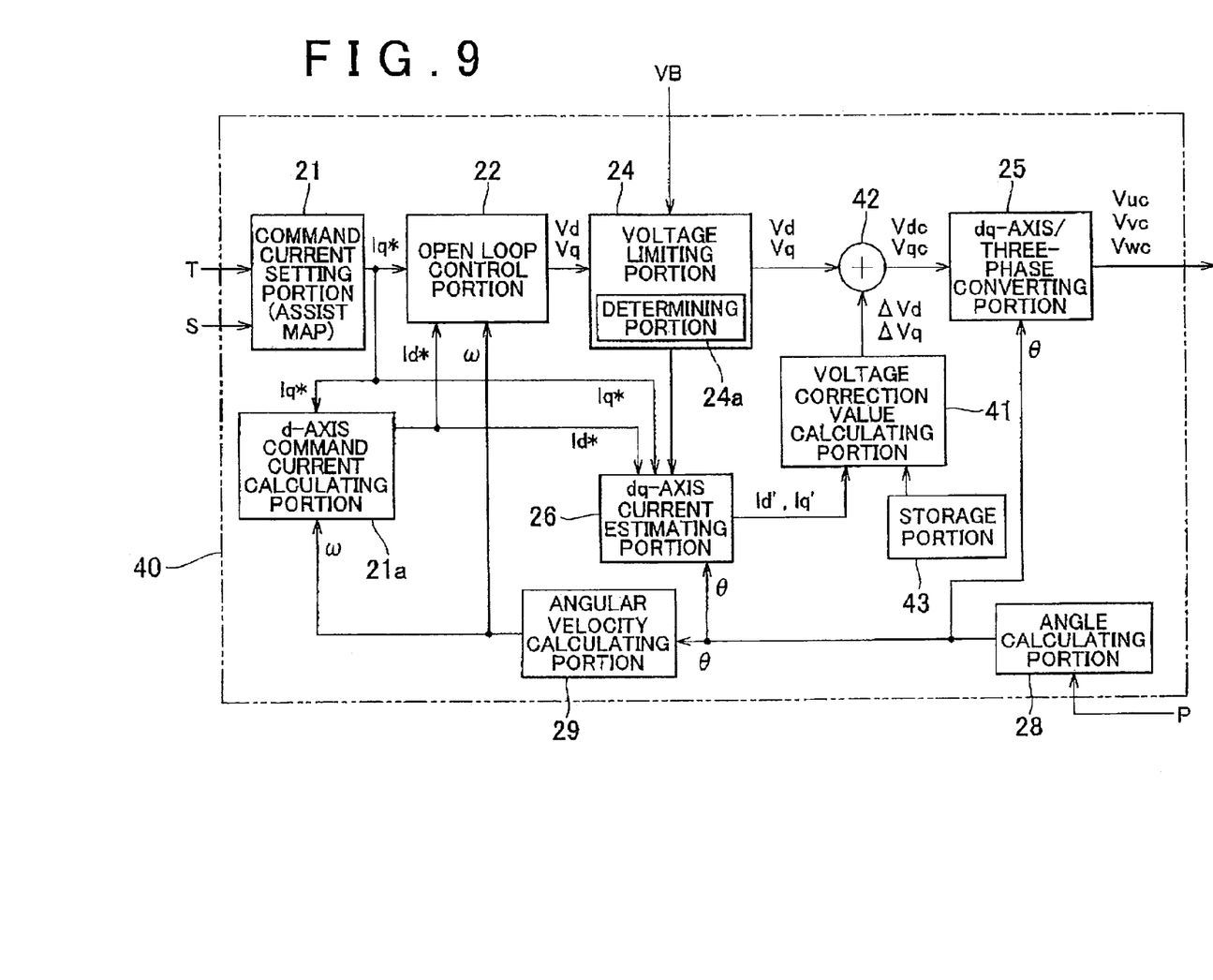
FIG. 9 is a block diagram showing the functional structure realized by a microcomputer used in a second practical application.

<5.2 Second practical application> FIG. 9 is a block diagram showing the functional structure realized by a microcomputer 40 used in a second practical application. The microcomputer 40 is used in place of the microcomputer 20 that is used in the motor control apparatus shown in FIG. 2. Some of the functional constituent elements of the microcomputer 40 have been changed. Accordingly, the functional constituent elements of the microcomputer 40 that are the same as those of the microcomputer 20 will be denoted by the same reference characters and descriptions of those elements will be omitted. Only the functional constituent elements that are different will be described here. As shown in FIG. 9, of the functional constituent elements in the microcomputer 20, the microcomputer 40 does not have the storage portion 23 or the inductance adjusting portion 27. Instead, the microcomputer 40 has a voltage correction value calculating portion 41, an adder 42, and a storage portion 43. Also, the voltage correction value calculating portion 41 performs the calculation after reading the necessary data from the storage portion 43.

The voltage correction value calculating portion 41 obtains the phase voltage correction values ΔVd and ΔVq for correcting the d-axis voltage command value Vd and the q-axis voltage command value Vq, based on i) the d-axis current estimated value Id' and the q-axis current estimated value Iq' obtained by the dq-axis current estimating portion 26 and ii) the data read from the storage portion 43, and outputs the obtained phase voltage correction values ΔVd and ΔVq to the adder 42. The adder 42 obtains a corrected d-axis command voltage Vdc by adding the voltage correction value ΔVd to the d-axis command voltage Vd provided by the voltage limiting portion 24, and obtains a corrected q-axis command voltage Vqc by adding the voltage correction value ΔVq to the q-axis command voltage Vq provided by the voltage limiting portion 24. The adder 42 then outputs the obtained corrected d-axis command voltage Vdc and the obtained corrected q-axis command voltage Vqc to the dq-axis/three-phase converting portion 25. In this case, the d-axis current estimated value Id' and the q-axis current estimated value Iq' are calculated with the d-axis voltage and the q-axis voltage, respectively, without being converted into phase currents, so the calculation load on the microcomputer 40 can be reduced. Incidentally, the voltage correction value calculating portion 41 and the adder 42 function as a command voltage correcting portion.

A method for suppressing fluctuation in the potential of the node N during a dead time period of the MOS-FETs in the motor drive circuit will now be described as an example of when this kind of microcomputer 40 is used. In order to accurately suppress fluctuation in the potential of the node N, it is preferable to use the phase current estimated values Iu', Iv', and Iw' to which the d-axis current estimated value Id' and the q-axis current estimated value Iq' have been converted, just as when suppressing a voltage drop described above in the first practical application. However, in order to reduce the calculation load on the microcomputer 40, fluctuation in the potential of the node N can also be suppressed by correcting the d-axis voltage command value Vd and the q-axis voltage command value Vq using the d-axis current estimated value Id' and the q-axis current estimated value Iq'. Accordingly, a method for suppressing fluctuation in the potential of the node N without converting the d-axis current estimated value Id' and the q-axis current estimated value Iq' to the phase current estimated values Iu', Iv', and Iw' will now be described.

Figure 10A:
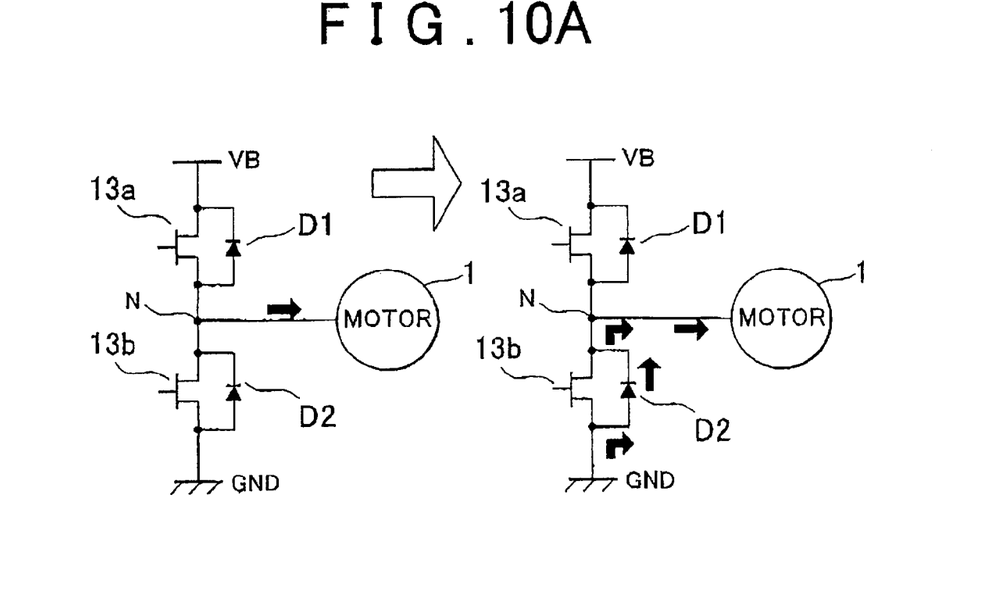
FIG. 10A is a circuit diagram showing current flowing into a brushless motor via an x-phase MOS-FET.

In the motor drive circuit 13, two MOS-FETs are connected in series for each phase, i.e., the u-phase, the v-phase, and the w-phase. FIG. 10A is a circuit diagram showing current flowing into the brushless motor 1 via MOS-FETs 13a and 13b of an x-phase (x=u, v, w), and FIG. 10B is a circuit diagram showing current flowing out of the brushless motor 1 via the MOS-FETs 13a and 13b of the x-phase (x=u, v, w).

A dead time period during which the MOS-FETs 13a and 13b are simultaneously turned off is provided to prevent through-current from flowing from the power supply terminal to the ground terminal by the MOS-FETs 13a and 13b being turned on simultaneously. Originally, current does not flow to the MOS-FETs 13a and 13b during this dead time period. However, parasitic diodes D1 and D2 are provided with the MOS-FETs 13a and 13b, respectively, and the armature winding of the brushless motor 1 acts as an inductor.

Therefore, as shown in FIG. 10A, when current flows into the brushless motor 1, it continuously flows in from the ground terminal through the parasitic diode D2 of the MOS-FET 13b even if the MOS-FETs 13a and 13b have been simultaneously turned off. Therefore, the potential of the point of contact (hereinafter referred to as the "node N") of the MOS-FET 13a and the MOS-FET 13b becomes a value that is lower than the ground potential GND by the potential difference from the voltage drop due to the parasitic diode D2. However, the potential difference from the voltage drop is small so the potential of the node N is substantially equivalent to the ground potential GND.

Figure 10B:
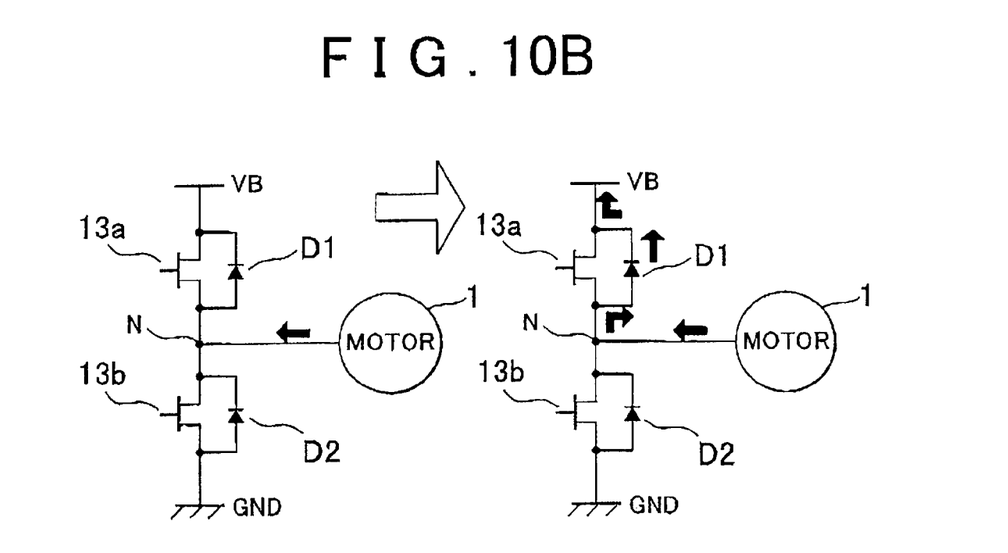
FIG. 10B is a circuit diagram showing current flowing out of the brushless motor via the x-phase MOS-FET.

On the other hand, as shown in FIG. 10B, when current flows out from the brushless motor 1, it continuously flows out to the power supply terminal through the parasitic diode D1 of the MOS-FET 13a even if the MOS-FETs 13a and 13b have been simultaneously turned off. Therefore, the potential of the node N is a value that is higher than the power supply voltage value VB by the potential difference from the voltage drop due to the parasitic diode D1. However, the potential difference from the voltage drop is small so the potential of the node N is substantially equivalent to the power supply voltage value VB.

The brushless motor 1 is normally driven by the motor drive circuit 13 that is controlled by three types of PWM signals having duty ratios corresponding to the phase voltage command values Vu, Vv, and Vw provided by the three-phase PWM modulator 12, and the negative signals of those PWM signals. At this time, the potential of the node N is determined by the PWM signals provided by the three-phase PWM modulator 12 and the negative signals of those PWM signals. However, during the dead time period, the potential of the node N matches the ground potential GND or the power supply voltage value VB depending on the direction of the current flowing through the brushless motor 1 right before the dead time period, so the potential of the node N fluctuates independently of the potential determined by the PWM signals and the negative signals of those PWM signals.

Therefore, if data indicative of the corresponding relationship between i) the d-axis current value and the q-axis current value that also include the direction of the current flowing through the MOS-FETs 13a and 13b and ii) the voltage correction value of the node N at that time is stored in the format of a table, for example, in the storage portion 43 of the microcomputer 40, the voltage correction value calculating portion 41 obtains the d-axis voltage correction value $\Delta$Vd corresponding to the d-axis current estimated value Id' and the q-axis voltage correction value $\Delta$Vq corresponding to the q-axis current estimated value Iq'. Then the adder 42 obtains a corrected voltage command value Vdc by adding the voltage correction value $\Delta$Vd to the d-axis voltage command value Vd, and obtains a corrected voltage command value Vqc by adding the voltage correction value $\Delta$Vq to the q-axis voltage command value Vq. The motor drive circuit 13 is then driven based on the corrected voltage command values Vdc and Vqc. In this case, the calculation load on the microcomputer 40 necessary to suppress fluctuation in the potential of the node N during the dead time period can be reduced.

What is claimed is:

1. A motor control apparatus that drives a brushless motor, comprising:
    a current command value setting portion that sets a d-axis current command value and a q-axis current command value that are indicative of currents to be supplied to the brushless motor;
    a voltage command value calculating portion that calculates a d-axis voltage command value and a q-axis voltage command value that are indicative of voltages to be applied to the brushless motor in order to supply the current indicated by the d-axis current command value and the q-axis current command value to the brushless motor;
    a determining portion that determines whether a magnitude of a command voltage vector, formed by the d-axis voltage command value as a d-axis voltage component and the q-axis voltage command value as a q-axis voltage component, is greater than a predetermined voltage value;
    a voltage vector adjusting portion that adjusts the magnitude of a voltage vector that corresponds to a q-axis current and that forms the command voltage vector in order to adjust the magnitude of the command voltage vector to be equal to or less than the predetermined voltage value when the determining portion determines the magnitude of the command voltage vector is greater than the predetermined voltage value; and
    a current estimating portion that estimates a q-axis current estimated value based on i) a ratio of the magnitude of the voltage vector after adjustment divided by the magnitude of the voltage vector before adjustment, and ii) the q-axis current command value.

2. The motor control apparatus according to claim 1, further comprising:
    a first storage portion in which first data indicative of a corresponding relationship between a first parameter value and at least one of a d-axis current value or a q-axis current value is stored; and
    a parameter value calculating portion that reads the first data corresponding to the q-axis current estimated value from the first storage portion, and calculates a first estimated parameter value based on the read first data and the q-axis current estimated value,
    wherein the voltage command value calculating portion calculates the d-axis voltage command value and the q-axis voltage command value using the calculated first estimated parameter value.

3. The motor control apparatus according to claim 1, further comprising:
    a phase current converting portion that converts the q-axis current estimated value to a phase current estimated value.

4. The motor control apparatus according to claim 3, further comprising:
    a motor driving portion that includes two switching elements connected in series for each phase and drives the brushless motor;
    a second storage portion in which second data indicative of a corresponding relationship between a second parameter value for each phase and at least one of the d-axis current value or the q-axis current value is stored; and a phase voltage correcting portion that corrects a voltage of a node of the two switching elements, wherein the phase voltage correcting portion reads the second data corresponding to the phase current estimated value from the second storage portion, calculates a second estimated parameter value based on the read second data and the phase current estimated value, and corrects the voltage of the node using the calculated second estimated parameter value.

5. The motor control apparatus according to claim 1, further comprising:

a command voltage correcting portion that corrects at least one of the d-axis voltage command value or the q-axis voltage command value based on the q-axis current estimated value.

6. The motor control apparatus according to claim 1, wherein the predetermined voltage value is a voltage value of a power supply of the brushless motor.

7. An electric power steering system provided with the motor control apparatus according to claim 1.

8. A motor control apparatus that drives a brushless motor, comprising:

a first current command value setting portion that sets a q-axis current command value indicative of a current to be supplied to the brushless motor;

an angular velocity detecting portion that detects an angular velocity of a rotor of the brushless motor;

a second current command value setting portion that sets a d-axis current command value indicative of a d-axis current to be supplied to the brushless motor based on at least the q-axis current command value and the angular velocity;

a voltage command value calculating portion that calculates a d-axis voltage command value and a q-axis voltage command value that are indicative of voltages to be applied to the brushless motor in order to supply the current indicated by the d-axis current command value and the q-axis current command value to the brushless motor;

a determining portion that determines whether the magnitude of a command voltage vector, formed by the d-axis voltage command value as a d-axis voltage component and the q-axis voltage command value as a q-axis voltage component, is greater than a predetermined voltage value;

a voltage vector adjusting portion that adjusts the magnitude of a voltage vector that corresponds to a d-axis current and that forms the command voltage vector in order to adjust the magnitude of the command voltage vector to be equal to or less than the predetermined voltage value when the determining portion determines the magnitude of the command voltage vector is greater than the predetermined voltage value; and a current estimating portion that estimates a d-axis current estimated value based on i) a ratio of the magnitude of the voltage vector after adjustment divided by the magnitude of the voltage vector before adjustment, and ii) the d-axis current command value.

9. The motor control apparatus according to claim 8, further comprising:

a first storage portion in which first data indicative of a corresponding relationship between a first parameter value and at least one of a d-axis current value or a q-axis current value is stored; and a parameter value calculating portion that reads the first data corresponding to the d-axis current estimated value from the first storage portion, and calculates a first estimated parameter value based on the read first data and the d-axis current estimated value, wherein the voltage command value calculating portion calculates the d-axis voltage command value and the q-axis voltage command value using the calculated first estimated parameter value.

10. The motor control apparatus according to claim 8, further comprising:

a phase current converting portion that converts the d-axis current estimated value to a phase current estimated value.

11. The motor control apparatus according to claim 10, further comprising:

a motor driving portion that includes two switching elements connected in series for each phase and drives the brushless motor;

a second storage portion in which second data indicative of a corresponding relationship between a second parameter value for each phase and at least one of the d-axis current value or the q-axis current value is stored; and a phase voltage correcting portion that corrects a voltage of a node of the two switching elements, wherein the phase voltage correcting portion reads the second data corresponding to the phase current estimated value from the second storage portion, calculates a second estimated parameter value based on the read second data and the phase current estimated value, and corrects the voltage of the node using the calculated second estimated parameter value.

12. The motor control apparatus according to claim 8, further comprising:

a command voltage correcting portion that corrects at least one of the d-axis voltage command value or the q-axis voltage command value based on the d-axis current estimated value.

13. The motor control apparatus according to claim 8, wherein the predetermined voltage value is a voltage value of a power supply of the brushless motor.

14. An electric power steering system provided with the motor control apparatus according to claim 8.

15. The motor control apparatus according to claim 1, wherein the ratio of the magnitude of the voltage vector after adjustment to the magnitude of the voltage vector before adjustment is multiplied by the q-axis current command value.

16. The motor control apparatus according to claim 8, wherein the ratio of the magnitude of the voltage vector after adjustment to the magnitude of the voltage vector before adjustment is multiplied by the q-axis current command value.

* * * * *